(12) United States Patent
Kong et al.

(10) Patent No.: US 8,050,237 B2
(45) Date of Patent: Nov. 1, 2011

(54) SYNCHRONIZATION CHANNEL NOISE POWER ESTIMATION

(75) Inventors: Hongwei Kong, Denville, NJ (US); Jun Wu, San Diego, CA (US)

(73) Assignee: Broadcom Corporation, Irvine, CA (US)

(*) Notice: Subject to any disclaimer, the term of this patent is extended or adjusted under 35 U.S.C. 154(b) by 980 days.

(21) Appl. No.: 11/963,881

(22) Filed: Dec. 24, 2007

(65) Prior Publication Data

US 2009/0034484 A1   Feb. 5, 2009

Related U.S. Application Data

(60) Provisional application No. 60/963,010, filed on Aug. 1, 2007.

(51) Int. Cl.
*H04B 1/216* (2006.01)
(52) U.S. Cl. ........................ 370/335; 370/345
(58) Field of Classification Search ........................ None
See application file for complete search history.

(56) References Cited

U.S. PATENT DOCUMENTS

2004/0028013 A1* 2/2004 Fitton et al. .................. 370/335
2005/0238086 A1* 10/2005 Kokubo ........................ 375/148

OTHER PUBLICATIONS

3GPP TS 25.211 Technical Specification v6.7.0 (Dec. 2005) (Release 6); 3GPP Organizational Partners; Dec. 2005; pp. 1-50.

\* cited by examiner

*Primary Examiner* — Jianye Wu
(74) *Attorney, Agent, or Firm* — Garlick Harrison & Markison

(57) ABSTRACT

Apparatus and method to process a pilot channel and a synchronization channel to obtain a combined noise estimate of the pilot channel and the synchronization channel that is synchronized to the pilot channel. The combined noise estimation is processed to determine a first noise component for a period when both the pilot channel and the synchronization channel are present. Then, the combined noise estimate is processed to determine a second noise component for a period when only the pilot channel is present. Next, the second noise component is subtracted from the first noise component to derive a noise estimation for the synchronization channel. The technique may be applied to the Common Pilot Channel (CPICH), and the Synchronization Channel (SCH) defined in a $3^{rd}$ Generation Partnership Project standard specification.

11 Claims, 10 Drawing Sheets

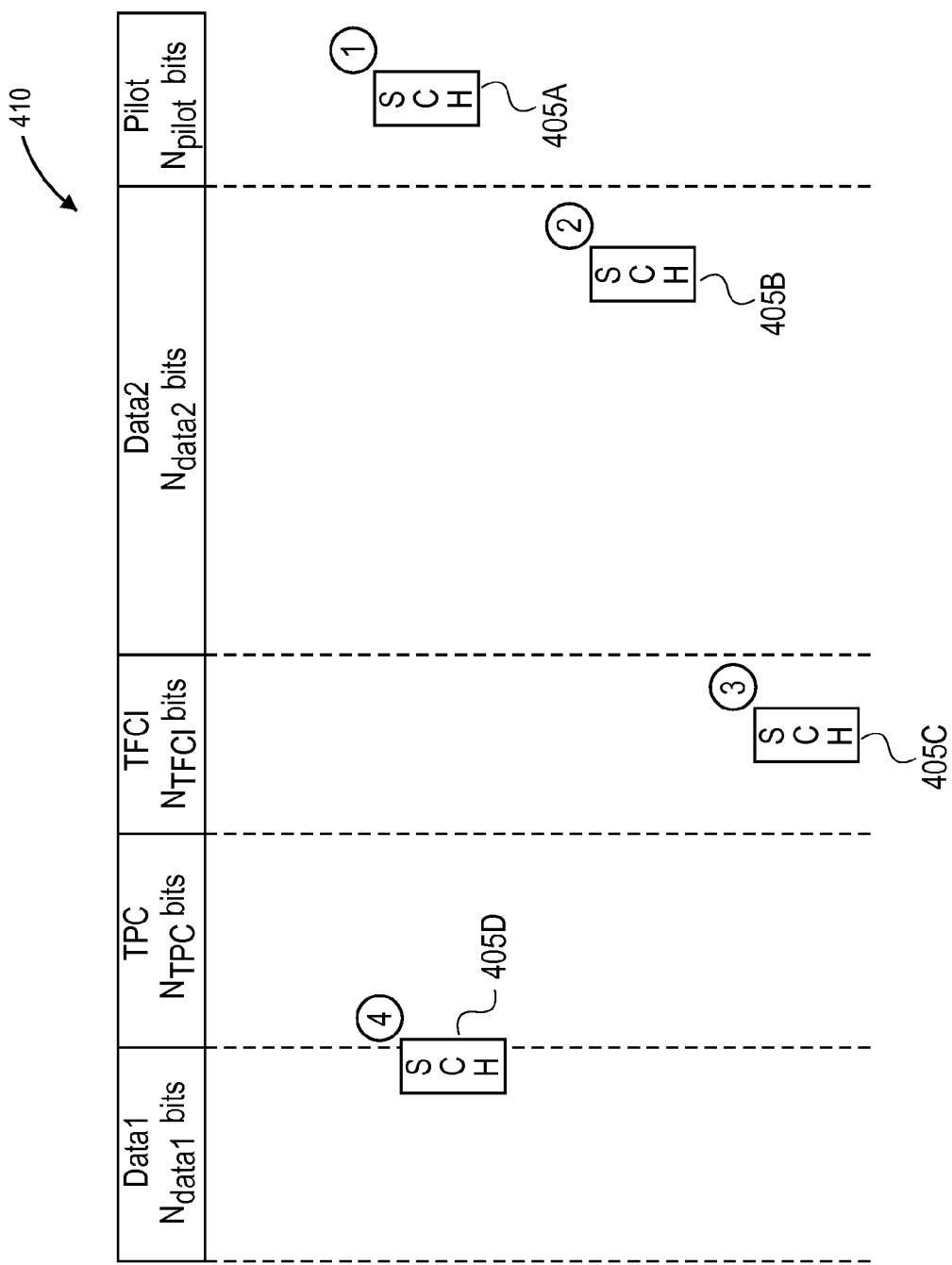

SYNCHRONIZATION CHANNEL NOISE POWER ESTIMATION

CROSS REFERENCE TO RELATED APPLICATION

This application claims the benefit of priority to U.S. Provisional Patent Application Ser. No. 60/963,010; filed Aug. 1, 2007; and titled "Synchronization channel noise power estimation," which is incorporated herein by reference.

BACKGROUND OF THE INVENTION

1. Technical Field of the Invention

The present invention relates generally to wireless communication systems and, more particularly, to noise power estimation in a synchronization channel for a downlink receiver in such a wireless communication system.

2. Description of Related Art

Mobile communication has changed the way people communicate and mobile phones have been transformed from a luxury item to an essential part of every day life. The use of mobile phones today is generally dictated by social situations, rather than being hampered by location or technology. While voice connections fulfill the basic need to communicate, and mobile voice connections continue to filter even further into the fabric of every day life, the mobile Internet is the next step in the mobile communication revolution. The mobile Internet is poised to become a common source of everyday information, and easy, versatile mobile access to this data will be taken for granted.

Third generation (3G) cellular networks have been specifically designed to fulfill these future demands of the mobile Internet. As these services grow in popularity and usage, factors such as cost efficient optimization of network capacity and quality of service (QoS) will become even more essential to cellular operators than it is today. These factors may be achieved with careful network planning and operation, improvements in transmission methods, and advances in receiver techniques. To this end, carriers want technologies that will allow them to increase downlink throughput and, in turn, offer advanced QoS capabilities and speeds that rival those delivered by cable modem and/or DSL service providers. In this regard, networks based on Wideband Code Division Multiple Access (WCDMA) technology may make the delivery of data to end users a more feasible option for today's wireless carriers.

The General Packet Radio Service (GPRS) and Enhanced Data rates for GSM Evolution (EDGE) technologies may be utilized for enhancing the data throughput of present second generation (2G) systems such as GSM. The Global System for Mobile telecommunications (GSM) technology may support data rates of up to 14.4 kilobits per second (Kbps), while the GPRS technology may support data rates of up to 115 Kbps by allowing up to 8 data time slots per time division multiple access (TDMA) frame. The GSM technology, by contrast, may allow one data time slot per TDMA frame. The EDGE technology may support data rates of up to 384 Kbps. The EDGE technology may utilizes 8 phase shift keying (8-PSK) modulation for providing higher data rates than those that may be achieved by GPRS technology. The GPRS and EDGE technologies may be referred to as "2.5G" technologies.

The Universal Mobile Telecommunications System (UMTS) technology with theoretical data rates as high as 2 Mbps, is an adaptation of the WCDMA 3G system by GSM. One reason for the high data rates that may be achieved by UMTS technology stems from the 5 MHz WCDMA channel bandwidths versus the 200 KHz GSM channel bandwidths. The High Speed Downlink Packet Access (HSDPA) technology is an Internet protocol (IP) based service, oriented for data communications, which adapts WCDMA to support data transfer rates on the order of 10 megabits per second (Mbits/s). Developed by the 3G Partnership Project (3GPP) group, the HSDPA technology achieves higher data rates through a plurality of methods. For example, many transmission decisions may be made at the base station level, which is much closer to the user equipment as opposed to being made at a mobile switching center or office. These may include decisions about the scheduling of data to be transmitted, when data is to be retransmitted, and assessments about the quality of the transmission channel. The HSDPA technology may also utilize variable coding rates. The HSDPA technology supports 16-level Quadrature Amplitude Modulation (16-QAM) over a high-speed downlink shared channel (HS-DSCH), which permits a plurality of users to share an air interface channel.

In some instances, HSDPA may provide a two-fold improvement in network capacity as well as data speeds up to five times (over 10 Mbit/s) higher than those in even the most advanced 3G networks. HSDPA may also shorten the roundtrip time between network and terminal, while reducing variances in downlink transmission delay. These performance advances may translate directly into improved network performance and higher subscriber satisfaction. Since HSDPA is an extension of the GSM family, it also builds directly on the economies of scale offered by one of the world's most popular mobile technology. HSDPA may offer breakthrough advances in WCDMA network packet data capacity, enhanced spectral and radio access networks (RAN) hardware efficiencies, and streamlined network implementations, plus others. Those improvements may directly translate into lower cost-per-bit, faster and more available services, and a network that is positioned to compete more effectively in the data-centric markets of the future.

The capacity, quality and cost/performance advantages of HSDPA yield measurable benefits for network operators, and, in turn, their subscribers. For operators, this backwards-compatible upgrade to current WCDMA networks is a logical and cost-efficient next step in network evolution. When deployed, HSDPA may co-exist on the same carrier as the current WCDMA Release 99 services, allowing operators to introduce greater capacity and higher data speeds into existing WCDMA networks. Operators may leverage this solution to support a considerably higher number of high data rate users on a single radio carrier. HSDPA makes true mass-market mobile IP multimedia possible and drive the consumption of data-heavy services, while at the same time reducing the cost-per-bit of service delivery, thus boosting both revenue and bottom-line network profits. For data-hungry mobile subscribers, the performance advantages of HSDPA may translate into shorter service response times, less delay and faster perceived connections. Users may also download packet-data over HSDPA while conducting a simultaneous speech call.

HSDPA may provide a number of significant performance improvements when compared to previous or alternative technologies. For example, HSDPA extends the WCDMA bit rates up to 10 Mbps, achieving higher theoretical peak rates with higher-order modulation (16-QAM) and with adaptive coding and modulation schemes. The maximum QPSK bit rate is 5.3 Mbit/s and 10.7 Mbit/s with 16-QAM. Theoretical bit rates of up to 14.4 Mbit/s may be achieved with no channel coding. The terminal capability classes range from 900 kbit/s to 1.8 Mbit/s with QPSK modulation and 3.6 Mbit/s and up with 16-QAM modulation. The highest capability class supports the maximum theoretical bit rate of 14.4 Mbit/s.

Where HSDPA is a downlink protocol, High Speed Uplink Packet Access (HSUPA) technology addresses the uplink communication. HSUPA is also specified by the 3GPP group to provide a complement data link to HSDPA. HSUPA also offers broadband IP and is based on software. HSUPA also extends the WCDMA bit rates, but the uplink rates may be less than the downlink rates of HSDPA. Where prior protocols severely limited the uplink connections, HSUPA allows for much higher uplink rates.

With the advent of HSUPA/HSDPA technology, a number of new, as well as existing, communication channels are specified under the 3GPP telecommunication standard. For example, two of the channels that are utilized for establishing a radio link (RL) between User Equipment (UE) and a base station are the common pilot channel and one or more synchronization channels. While common pilot channel and data channel for the UE may share the same scrambling code, a synchronization channel never uses the same scrambling code as the common pilot channel or data channel for the UE. Therefore, in reference to the data channel and the pilot channel, SCH acts as a source of interference. Since the synchronization channel occurs for just a fraction of a given slot of a channel, its effect is intermittent.

In application, the intermittent timing of the synchronization channel may have consequences for calculating certain parameters, such as SNR. Because power control at the UE is a fundamental interest for proper CDMA/WCDMA operation, correct power indication of the downlink channels is desirable. One technique for assessing performance is to determine a signal-to-noise (SNR) ratio for a given channel. In order to obtain a signal parameter, such as a SNR calculation, noise estimates are made from a pilot component of a signal and signal power estimates are made from the data component or the dedicated pilot symbols for the UE (e.g. transmitted in the DPCCH). Since a synchronization channel (such as SCH) is active for only a portion of a slot, the synchronization adds a noise component for only a portion of the slot. Thus, it is desirable to distinguish the power component of the synchronization channel from those interferences from other cells and multipaths.

Accordingly, it would be advantageous to detect the noise level of the synchronization channel in a downlink receiver.

SUMMARY OF THE INVENTION

The present invention is directed to apparatus and methods of operation that are further described in the following Brief Description of the Drawings, the Detailed Description of the Embodiments of the Invention, and the Claims. Other features and advantages of the present invention will become apparent from the following detailed description of the embodiments of the invention made with reference to the accompanying drawings.

BRIEF DESCRIPTION OF THE DRAWINGS

FIG. 9A shows one embodiment of a structure for averaging symbols of a slot for CPICH with no transmit diversity to obtain noise estimation.

FIG. 9B shows one embodiment of a structure for averaging symbols of a slot for CPICH with transmit diversity to obtain noise estimation.

FIG. 10 shows a DPCH slot, in which SCH power may contribute to various segments of the DPCH signal, depending on the location of the SCH symbol.

DETAILED DESCRIPTION OF THE EMBODIMENTS OF THE INVENTION

The embodiments of the present invention may be practiced in a variety of settings that utilize a wireless communication receiver. The specific embodiments described below pertain to communication channels associated with a $3^{rd}$ Generation Partnership Project (3GPP) telecommunication technology, as well as others, and in particular, HSDPA/HSUPA technology associated with WCDMA. However, the invention need not be limited to such applications and other embodiments of the invention may be implemented in other communications protocols and standards. Furthermore, the invention is not limited for use with WCDMA only and may be used in many other wireless technologies as well.

Figure 1:
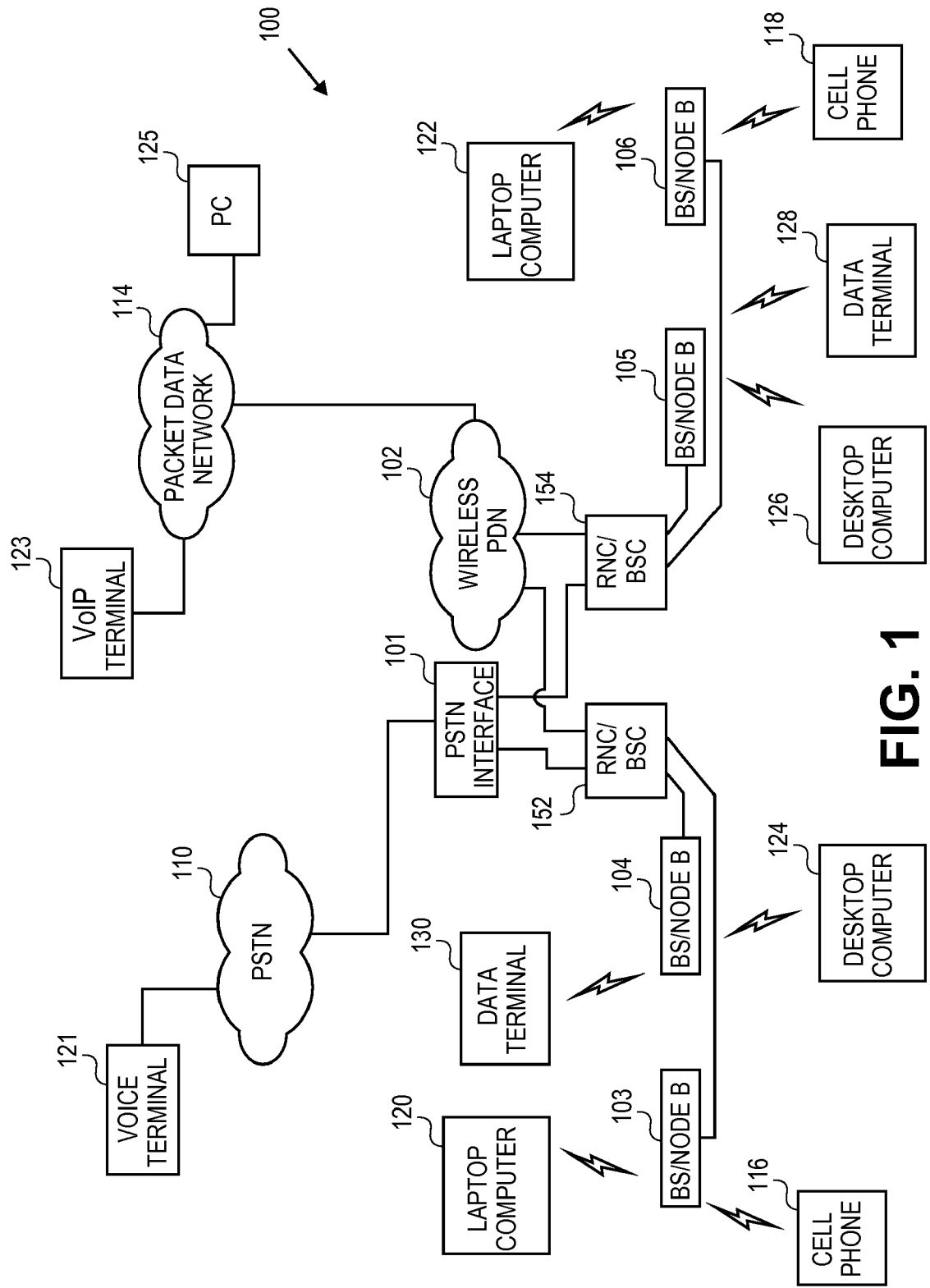
FIG. 1 is a system diagram showing a portion of a cellular wireless communication system that supports wireless devices operating according to a practice of the present invention.

FIG. 1 is a system diagram illustrating a portion of a cellular wireless communication system 100 that supports wireless terminals operating according to the practice of the invention. The cellular wireless communication system 100 includes a Public Switched Telephone Network (PSTN) interface 101 (such as a Mobile Switching Center), a wireless Packet Data Network (PDN) 102 (that may include GPRS Support Nodes, EDGE Support Nodes, WCDMA Support Nodes, and other components), Radio Network Controllers/Base Station Controllers (RNC/BSCs) 152 and 154, and base stations (BSs) 103, 104, 105, and 106, each of which are also referred to as Node B. The wireless network PDN 102 may be coupled to private and public packet data network 114, such as the Internet, WANs, LANs, etc. A conventional voice terminal 121 couples to a PSTN 110. A Voice over Internet Protocol (VoIP) terminal 123 and a personal computer (PC) 125 are shown coupled to the network 114. The PSTN Interface 101 may couple to a PSTN 110. Of course, this particular structure may vary from system to system and the particular system 100 is shown as an example only.

Each of the BS/Node Bs 103-106 services a cell or set of sectors within which it supports wireless communications. Wireless links that include both downlink components and uplink components support wireless communications between the base stations and their serviced wireless terminals. These wireless links support digital data communications, VoIP communications, and other digital multimedia communications. The cellular wireless communication system 100 may also be backward compatible in supporting analog operations as well. Cellular wireless communication system 100 supports one or more of the UMTS/WCDMA standards, the Global System for Mobile telecommunications (GSM) standards, the GSM General Packet Radio Service (GPRS) extension to GSM, the Enhanced Data rates for GSM (or Global) Evolution (EDGE) standards, and/or various other CDMA standards, TDMA standards and/or FDMA standards, etc. System 100 may also support one or more versions or "Releases" of the 3$^{rd}$ Generation Partnership Project (3GPP) telecommunication technology.

FIG. 1 also shows wireless terminals 116, 118, 120, 122, 124, 126, 128, and 130 coupled to cellular wireless communication system 100 via wireless links with base stations 103-106. As illustrated, wireless terminals may include cellular telephones 116 and 118, laptop computers 120 and 122, desktop computers 124 and 126, and data terminals 128 and 130. However, cellular wireless communication system 100 may support communications with other types of wireless terminals and devices as well. Devices such as laptop computers 120 and 122, desktop computers 124 and 126, data terminals 128 and 130, and cellular telephones 116 and 118, are typically enabled to "surf" the Internet, transmit and receive data communications such as email and text messaging, transmit and receive files, and to perform other data operations. Many of these data operations have significant download (downlink) data-rate requirements while the upload (uplink) data-rate requirements are not as severe. Some or all of wireless terminals 116-130 are therefore enabled to support the EDGE operating standard, the GPRS standard, the UMTS/WCDMA standards, the GSM standard and/or the 3GPP standard.

Figure 2:
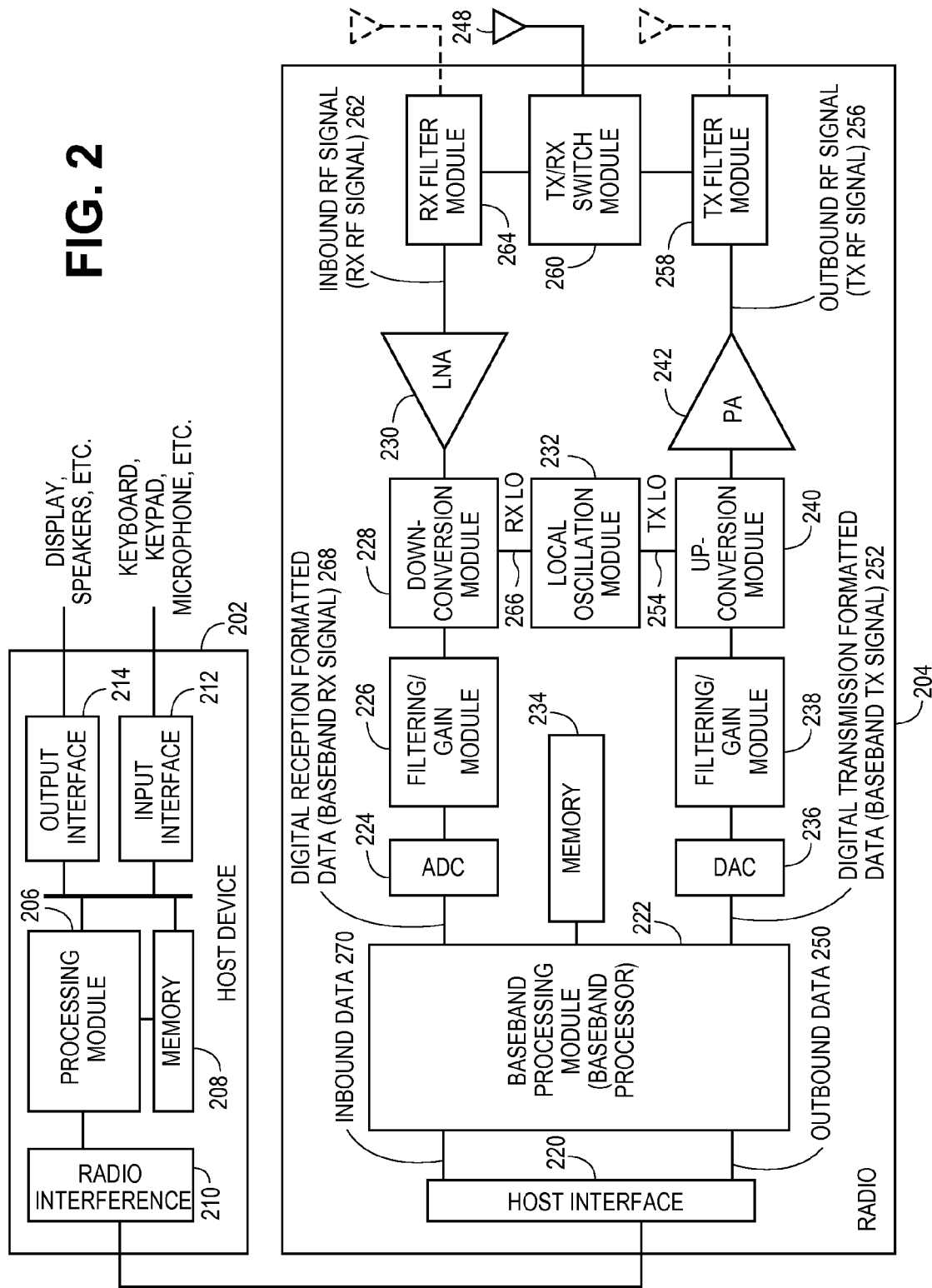
FIG. 2 is a circuit block diagram showing one embodiment of a wireless device for practicing of the present invention.

FIG. 2 is a schematic block diagram illustrating a wireless terminal that includes host processing components of a host device 202 and an associated radio 204. For cellular telephones, the host processing components of host device 202 and the radio are contained within a single housing. In some cellular telephones, the host processing components and some or all of the components of radio 204 are formed on a single Integrated Circuit (IC). For personal digital assistants hosts, laptop hosts, and/or personal computer hosts, radio 204 may reside within an expansion card and, therefore, reside separately from the host 202. The host processing components of host 202 may include a processing module 206, memory 208, radio interface 210, an input interface 212, and an output interface 214. Processing module 206 and memory 208 execute instructions to support host terminal functions. For example, for a cellular telephone host device, processing module 206 performs user interface operations and executes host software programs among other operations. Furthermore, as noted in FIG. 2, the host device may include or be coupled to one or more user interfaces (such as displays, speakers, headphones, keyboards, keypads, microphones, etc.).

Radio interface 210 allows data to be received from and sent to radio 204. For data received from radio 204 (e.g., inbound data), radio interface 210 provides the data to processing module 206 for further processing and/or routing to output interface 214. Output interface 214 provides connectivity to one or more output display devices. Radio interface 210 also provides data from processing module 206 to radio 204. Processing module 206 may receive the outbound data from one or more input device via input interface 212 or generate the data itself. For data received via input interface 212, the processing module 206 may perform a corresponding host function on the data and/or route it to radio 204 via radio interface 210.

Radio 204 includes a host interface 220, baseband (BB) processing module 222 (baseband processor) 222, analog-to-digital converter (ADC) 224, filtering/gain module 226, down conversion module 228, low noise amplifier (LNA) 230, local oscillation module 232, memory 234, digital-to-analog converter (DAC) 236, filtering/gain module 238, up-conversion module 240, power amplifier (PA) 242, RX filter module 264, TX filter module 258, TX/RX switch module 260, and antenna 248. Antenna 248 may be a single antenna that is shared by transmit and receive paths or may include separate antennas for the transmit path and the receive path. The antenna implementation may depend on the particular standard to which the wireless communication device is compliant.

Baseband processing module 222 in combination with operational instructions stored in memory 234, execute digital receiver functions and digital transmitter functions. The digital receiver functions include, but are not limited to, digital intermediate frequency to baseband conversion, demodulation, constellation demapping, descrambling, and/or decoding. The digital transmitter functions include, but are not limited to, encoding, scrambling, constellation mapping, modulation, and/or digital baseband to IF conversion. The transmit and receive functions provided by baseband processing module 222 may be implemented using shared processing devices and/or individual processing devices. Processing devices may include microprocessors, micro-controllers, digital signal processors, microcomputers, central processing units, field programmable gate arrays, programmable logic devices, state machines, logic circuitry, analog circuitry, digital circuitry, and/or any device that manipulates signals (analog and/or digital) based on operational instructions. Memory 234 may be a single memory device or a plurality of memory devices. Such a memory device may be a read-only memory, random access memory, volatile memory, non-volatile memory, static memory, dynamic memory, flash memory, and/or any device that stores digital information. Note that when baseband processing module 222 implements one or more of its functions via a state machine, analog circuitry, digital circuitry, and/or logic circuitry, the memory storing the corresponding operational instructions may be embedded with the circuitry comprising the state machine, analog circuitry, digital circuitry, and/or logic circuitry.

In operation, radio 204 receives outbound data 250 from the host processing components via host interface 220. Host interface 220 routes outbound data 250 to baseband processing module 222, which processes outbound data 250 in accordance with a particular wireless communication standard (e.g., UMTS/WCDMA, GSM, GPRS, EDGE, 3GPP, et cetera) to produce digital transmission formatted data 252. Digital transmission formatted data 252 is a digital base-band signal or a digital low IF signal.

Digital-to-analog converter 236 converts digital transmission formatted data 252 from the digital domain to the analog domain. Filtering/gain module 238 filters and/or adjusts the gain of the analog signal prior to providing it to up-conversion module 240. Up-conversion module 240 directly converts the analog baseband or low IF signal into an RF signal based on a transmitter local oscillation signal (TX LO) 254 provided by local oscillation module 232. Power amplifier 242 amplifies the RF signal to produce outbound RF signal 256, which is filtered by TX filter module 258. TX/RX switch module 260 receives the amplified and filtered RF signal from TX filter module 258 and provides output RF signal 256 signal to antenna 248, which transmits outbound RF signal 256 to a targeted device, such as to one of base stations 103-106 of FIG. 1.

Radio 204 also receives an inbound RF signal 262, which was transmitted by a base station via antenna 248, TX/RX switch module 260, and RX filter module 264. Low noise amplifier 230 receives inbound RF signal 262 and amplifies inbound RF signal 262 to produce an amplified inbound RF signal. Low noise amplifier 230 provides the amplified inbound RF signal to down conversion module 228, which converts the amplified inbound RF signal into an inbound low IF signal or baseband signal based on a receiver local oscillation signal (RX LO) 266 provided by local oscillation module 232. Down conversion module 228 provides the inbound low IF signal (or baseband signal) to filtering/gain module 226, which filters and/or adjusts the gain of the signal before providing it to analog to digital converter 224.

Analog-to-digital converter 224 converts the filtered inbound low IF signal (or baseband signal) from the analog domain to the digital domain to produce digital reception formatted data 268. Baseband processing module 222 demodulates, demaps, descrambles, and/or decodes the digital reception formatted data 268 to capture inbound data 270 in accordance with the particular wireless communication standard being implemented by radio 204. Host interface 220 provides inbound data 270 to the host processing components of host device 202 via radio interface 210.

Figure 3:
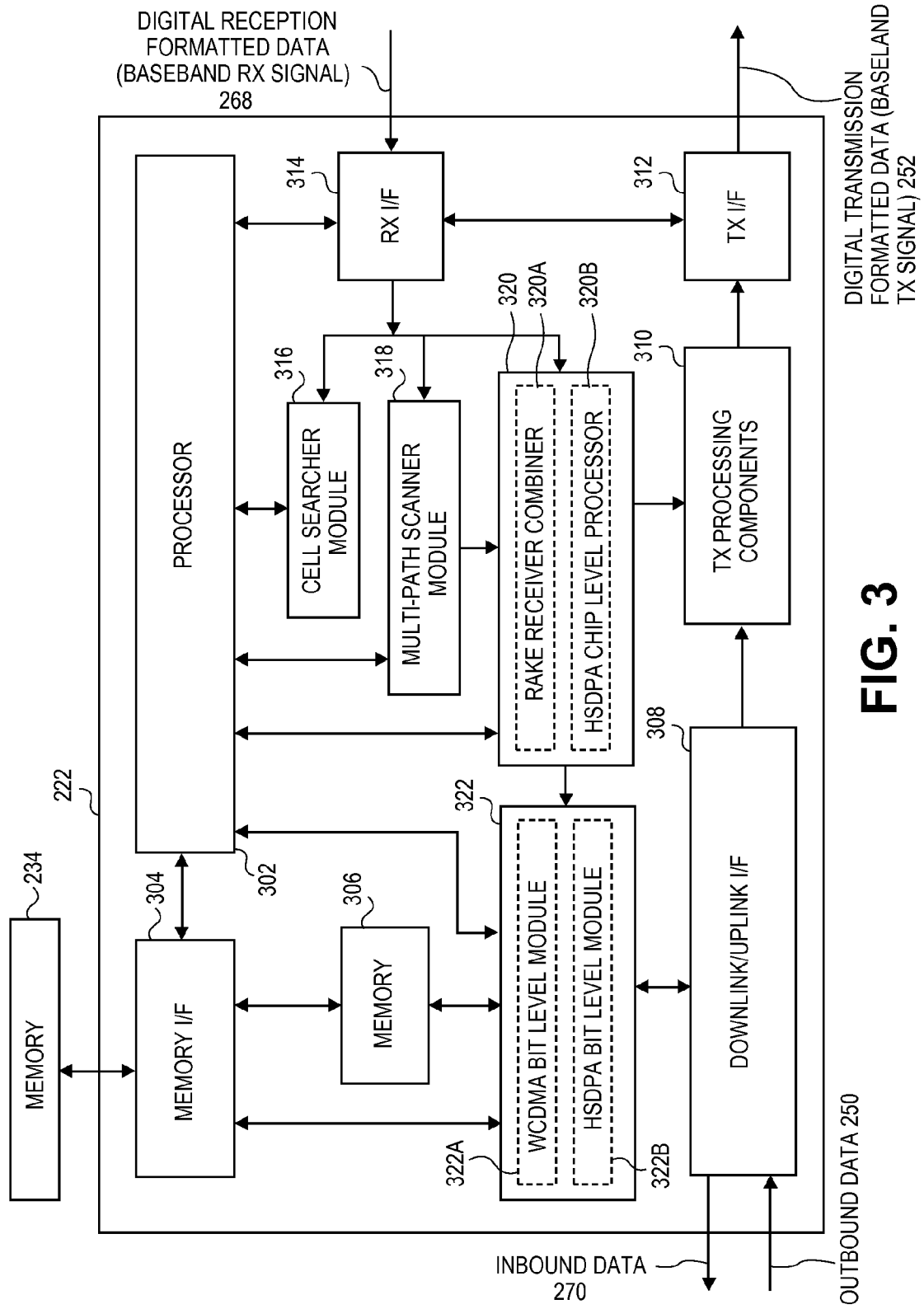
FIG. 3 is a block diagram illustrating components of a baseband processing module according to an embodiment of the present invention.

FIG. 3 is a block diagram illustrating one embodiment for baseband processing module 222 of FIG. 2. Components of baseband processing module (baseband processor) 222 include a processor 302, a memory interface 304, onboard memory 306, a downlink/uplink interface 308, TX processing components 310, and a TX interface 312. Baseband processing module 222 further includes an RX interface 314, a cell searcher module 316, a multi-path scanner module 318, a chip level processing module 320, and a bit level processing module 322.

Chip level processing module 320 includes a rake receiver combiner 320A that generally supports WCDMA receive processing operations and a HSDPA chip level processing module 320B that generally supports HSDPA receive processing operations. Bit level processing module 322 includes a WCDMA bit-level processing module 322A that supports WCDMA bit-level operations and a HSDPA bit-level processing module 322B that supports HSDPA bit-level operations.

In some embodiments, baseband processing module 222 couples to external memory 234. However, in other embodiments, memory 306 may fulfill the memory requirements of baseband processing module 302. According to some aspects of the present invention, memory 306 is cacheable while memory 234 is non-cacheable. Of course, in other embodiments, memory 234 may also be cacheable. As was previously described with reference to FIG. 2, baseband processing module 222 receives outbound data 250 from coupled host processing components 202 and provides inbound data 270 to the coupled host processing components 202. Further, baseband processing module 222 provides digital formatted transmission data (baseband TX signal) 252 to a coupled RF front end. Baseband processing module 222 receives digital reception formatted data (baseband RX signal) 268 from the coupled RF front end. As was previously described with reference to FIG. 2, an ADC 222 produces the digital reception formatted data (baseband RX data) 268 while DAC 236 of the RF front end receives the digital transmission formatted data (baseband TX signal) 252 from baseband processing module 222.

According to one particular embodiment of the present invention, the downlink/uplink interface 308 is operable to receive the outbound data 250 from coupled host processing components, e.g., the host processing component 202 via host interface 220. Further, the downlink/uplink interface 308 is operable to provide inbound data 270 to the coupled host processing components 202 via host interface 220. Baseband processing module 222 may be formed on a single integrated circuit with the other components of radio 204. Further, the radio 204 may be formed in a single integrated circuit along with the host processing components 202. Thus, in such case, all components of FIG. 2 excluding the antenna, display, speakers, et cetera and keyboard, keypad, microphone, et cetera may be formed on a single integrated circuit. However, in still other embodiments, baseband processing module 222 and the host processing components 202 may be formed on a separate integrated circuit. Many differing integrated circuit constructs are possible without departing from the teachings of the present invention.

TX processing components 310 and TX interface 312 couple to the RF front end as illustrated in FIG. 2 and to downlink/uplink interface 308. TX processing components 310 and TX interface 312 are operable to receive the outbound data from downlink/uplink interface 304, to process the outbound data to produce baseband TX signal 252 and to output baseband TX signal 252 to the RF front end as was described with reference to FIG. 2.

RX processing components, including cell searcher module 316, multi-path scanner module 318, chip level processing module 320, and in some cases processor 302, are operable to receive the RX baseband signal 268 from the RF front end as processed by RX I/F 314. Generally, RX I/F 314 produces soft symbols representing the digital reception formatted data 268 in a format suitable for use by these components. HSDPA chip level processing module 320B is operable to produce soft symbols output for use by processing module 322 for further processing, such as turbo coding.

Figure 4:
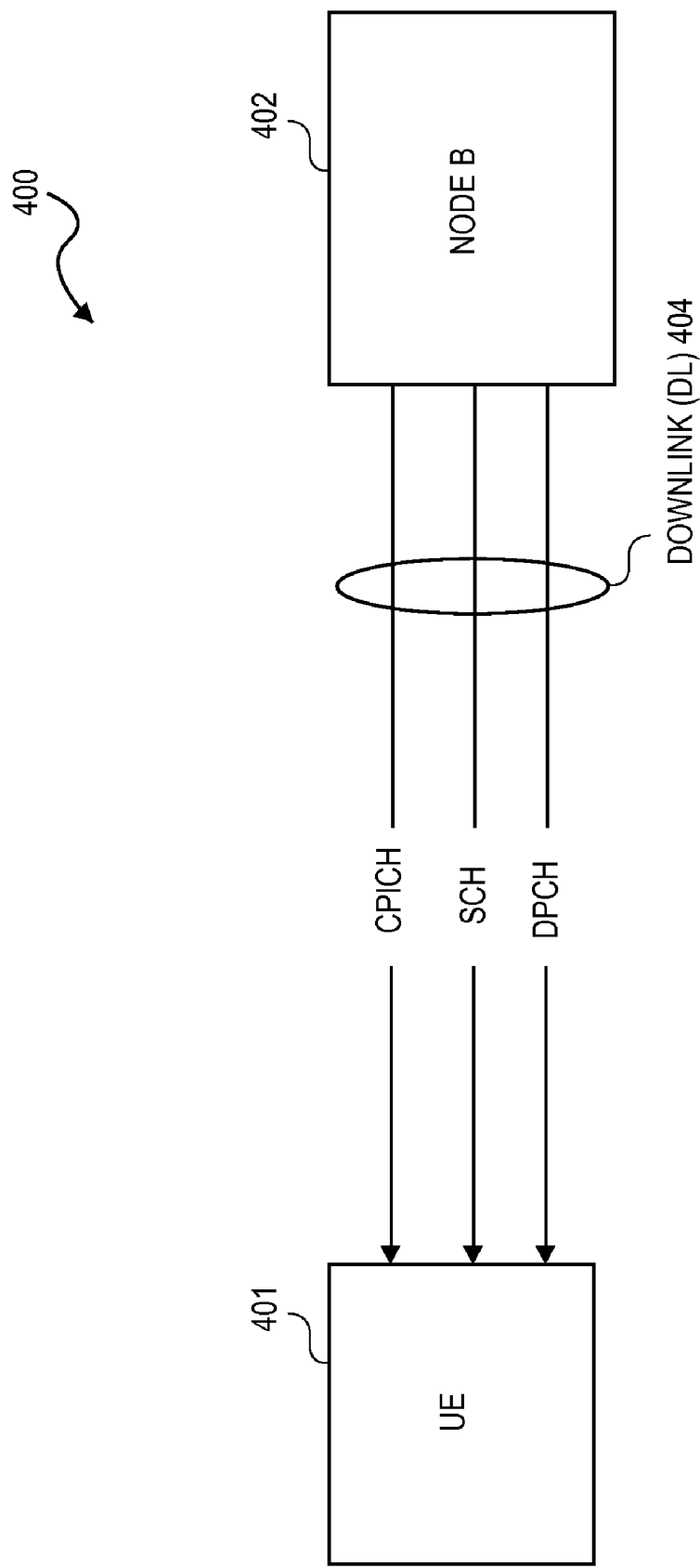
FIG. 4 is a diagram showing a radio link between a UE and Node B, in which certain downlink channels used for wireless communication are depicted.

FIG. 4 shows a diagram of a radio link 400 between a User Equipment (UE) 401 and Node B 402. UE 401 may be one of a variety of devices used for wireless communications. UE 401 may be one of the wireless terminals noted in FIG. 1. Node B 402 may be one of a variety of devices used for wireless communications. Node B 402 may be may be one of the BS/Node Bs noted in FIG. 1. UE 401 and/or Node B may implement part of or all of the components, modules, devices, circuits noted in FIG. 2 and/or FIG. 3.

UE 401 and Node B 402 may communicate using one or more communication protocols or standards, in which communication is achieved by establishing a downlink (DL) and/or uplink (UL) channel(s) for control signal and data transfer. Although various communication standards and protocols may be used, the particular radio link 400 is shown employing a 3GPP standard. In particular, three downlink channels 404 are shown. It is to be noted that various other DL and UL channels may be present, but the three shown are applicable in the description below for the practice of the invention. The three DL channels identified are the Common Pilot Channel (CPICH), Synchronization Channel (SCH) and Dedicated Physical Channel (DPCH).

CPICH is a fixed rate physical channel that carries a predefined bit sequence and is used to assist UE 301 in performing cell search operations. SCH carries one or more synchronization code(s) and is used to assist in obtaining slot and frame synchronization. In some instances, SCH may have a Primary SCH (PSCH) and a Secondary SCH (SSCH). PSCH is used to carry a primary synchronization code, which is the same for all slots, and is used to detect slot boundaries. SSCH is used to carry a secondary synchronization code, which may vary from slot to slot, and is used to identify scrambling code group and frame boundary. Generally, CPICH and SCH are synchronized so that the start of SCH in each slot coincides with the start of the corresponding CPICH slot. In one embodiment, SCH duration is 1/10 of a given slot. Thus, for a 2560-chip CPICH slot, SCH is 256-chips long.

DPCH is a dedicated downlink physical channel (as compared to a common downlink channel, such as CPICH) that is used to convey both control information and data from Node B 402 to UE 401. One implementation of DPCH is described below with reference to FIG. 5A. As will be noted below with reference to FIG. 6, DPCH has an offset from CPICH and SCH. That is, DPCH frame boundary may have a timing offset from CPICH frame boundary and SCH slot or frame boundary.

Figure 5A:
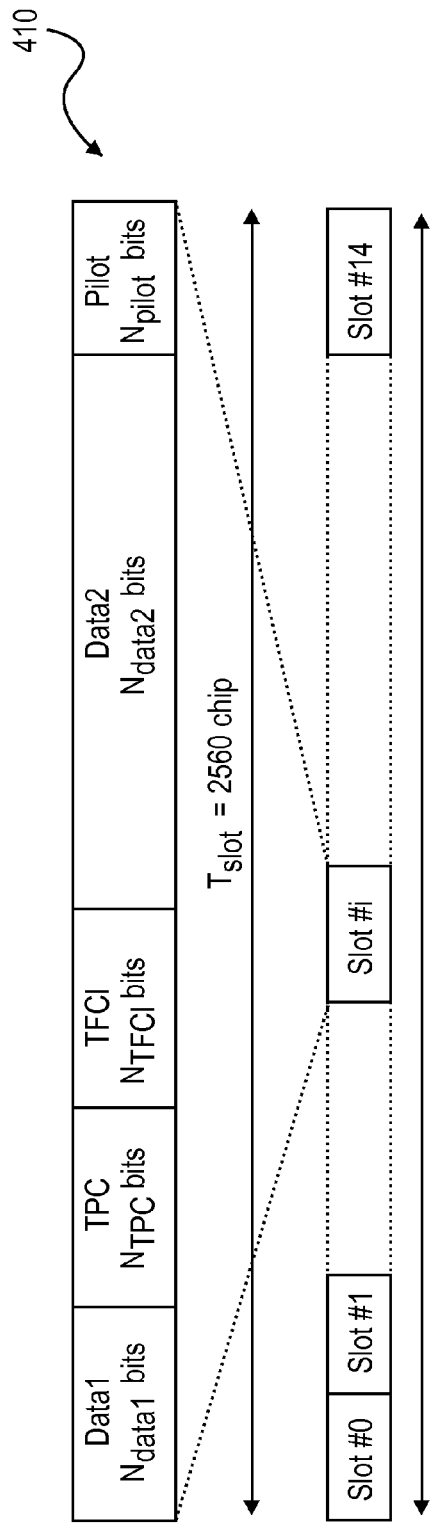
FIG. 5A shows a slot and frame structure for a DPCH channel based on a 3GPP standard.

An example DPCH slot and frame 410 are shown in FIG. 5A. Frame 410 is 10 msec in duration with 15 slots (slot #0-#14), in which three slots form a subframe of 2 msec in duration. In the particular example, each slot "i" of frame 410 has a chip rate of 2560. Each DPCH slot is divided into a number of segments or components of which some are data and some are control signals. In the particular example shown, frame 410 is comprised of Transmit Power Control (TPC) bits, Transport Format Combination Indicator (TFCI) bits, Pilot bits and Data bits. TPC bits ($N_{TPC}$ bits) are used for power control by the UE and TFCI bits ($N_{TFCI}$ bits) are used to inform the receiver about instantaneous transport format combination of the transport channels carried in Data1 and Data2 portions of the same DPCH frame. The pilot bits ($N_{pilot}$ bits) support channel estimation for coherent detection and DPCH SNR estimation. TPC, TFCI and pilot bits are control bits associated with DPCH. In some instances, TFCI may not be present, where only fixed-rate services are present.

The data portion of DPCH frame 410 may have one data segment or multiple data segments. In the example of FIG. 5A, two segments are shown, Data1 and Data2. Data1 bits ($N_{data1}$ bits) are shown located at the beginning of the slot, while Data2 bits ($N_{data2}$ bits) are shown located after TFCI. The Data bits are used to convey data information to the UE.

Figure 5B:
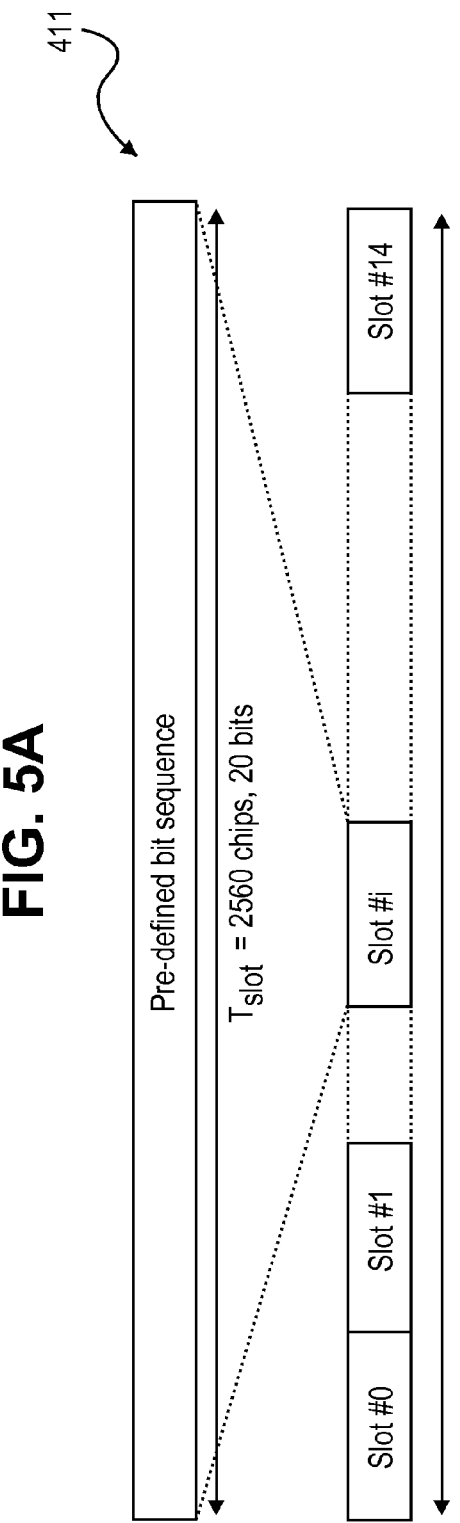
FIG. 5B shows a slot and frame structure for a CPICH channel based on the 3GPP standard.

An example CPICH slot and frame 411 are shown in FIG. 5B. The CPICH frame also has 15 slots and is 10 ms in duration. For each slot, a pre-defined bit sequence is transmitted from Node B 402. In the example, each CPICH slot is also 2560 chips and in one embodiment, the pre-defined bit sequence is 20 bits long. When transmit diversity is present, the CPICH bit sequence transmitted from Node B antenna 1 is different from the CPICH bit sequence transmitted from antenna 2.

Figure 6:
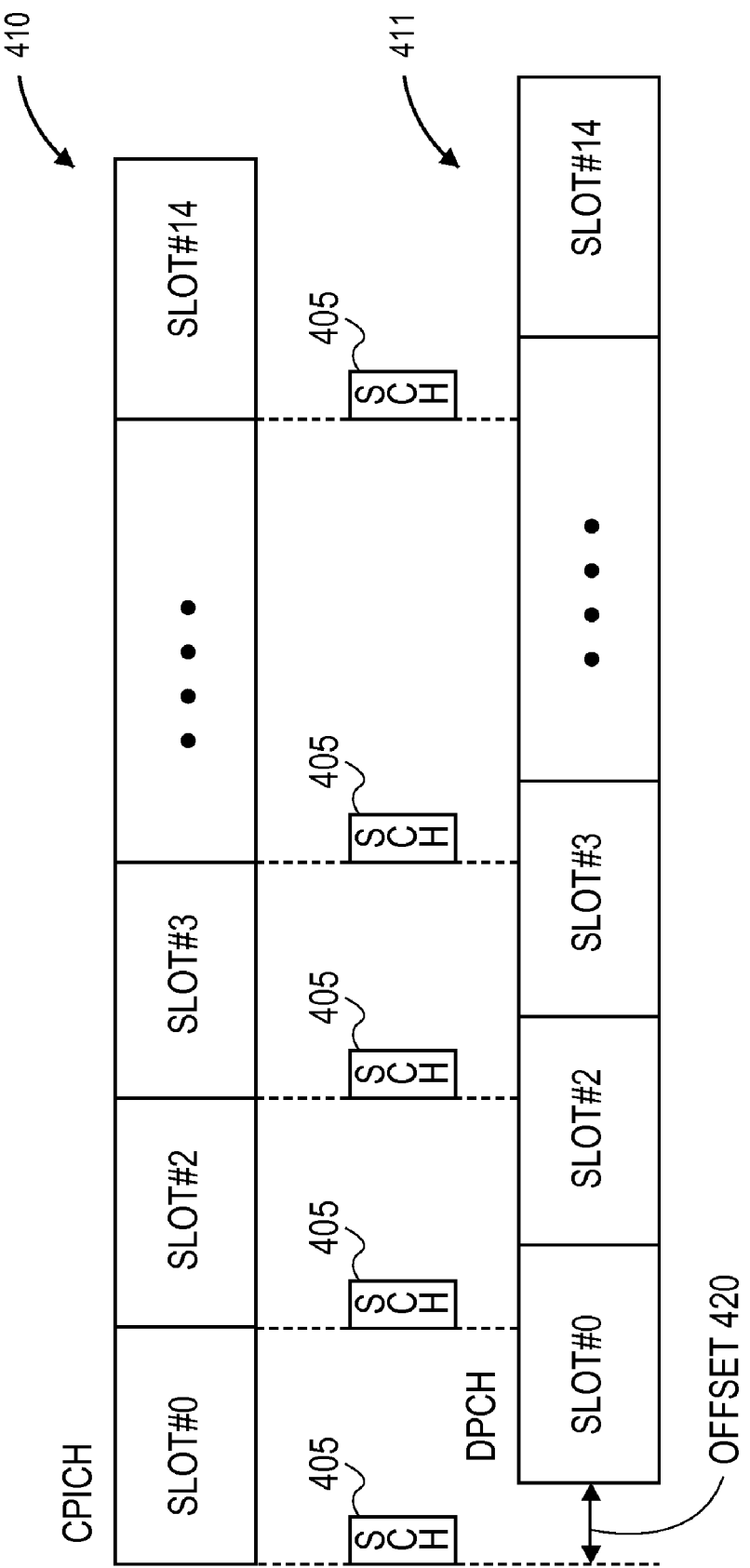
FIG. 6 shows a frame structure showing the timing relationship among CPICH, SCH and DPCH channels.

FIG. 6 illustrates the timing of CPICH, SCH and DPCH. As noted above, CPICH and SCH are synchronized in each slot, so that SCH occurs at the beginning of the CPICH slot. In one embodiment, SCH occupies the first 256 chips of a 2560 chip slot. On the other hand, DPCH usually has an offset 420 (in some instances, there may be no offset) so that DPCH frame 411 commences at a later time from the commencement of CPICH frame 410. The amount of offset 420 may vary considerably and, therefore, offset 420 may be small or it may be large. The amount of offset 420 may remain constant or it may be adjusted in the Node B based on UE timing measurement reports on a need-basis.

It is to be noted that the described channels CPICH, SCH and DPCH are generally known and specified in various communication standards, including the afore-mentioned 3GPP standard. One of the applications of a pilot signal in a receiver is to use the detected pilot to derive estimates of noise power and signal power. Since power control and signal strength are important aspects of WCDMA operation, a signal-to-noise ratio (SNR) determination is assessed for a given signal to control the signal power strength relative to the noise. In determining a SNR value for a signal, signal power estimation may be obtained by detecting the data segment of the channel, such as Data1 and/or Data2 of DPCH, or by detecting the power of the dedicated pilot symbols of DPCH. The noise power estimation may be obtained from the dedicated pilot segment of DPCH. Then, with the two components known, a SNR calculation may be made.

It is also to be noted that SCH may contribute to the overall noise and interference to the DPCH. However, SCH is only present for approximately 1/10 of the CPICH slot and the noise contribution is only for a fraction of the duration of each slot. Thus, the noise power contribution generated by SCH can impact DPCH differently, depending on which segment of DPCH coincides with the particular SCH. This variation results because of the offset between DPCH and CPICH. Accordingly, it would be advantageous to estimate the noise power associated with SCH separate from estimating the noise for DPCH, so that, if necessary, SCH noise power contribution may be analyzed separately. This may be particularly useful when SCH becomes the major source of interference.

Figure 7:
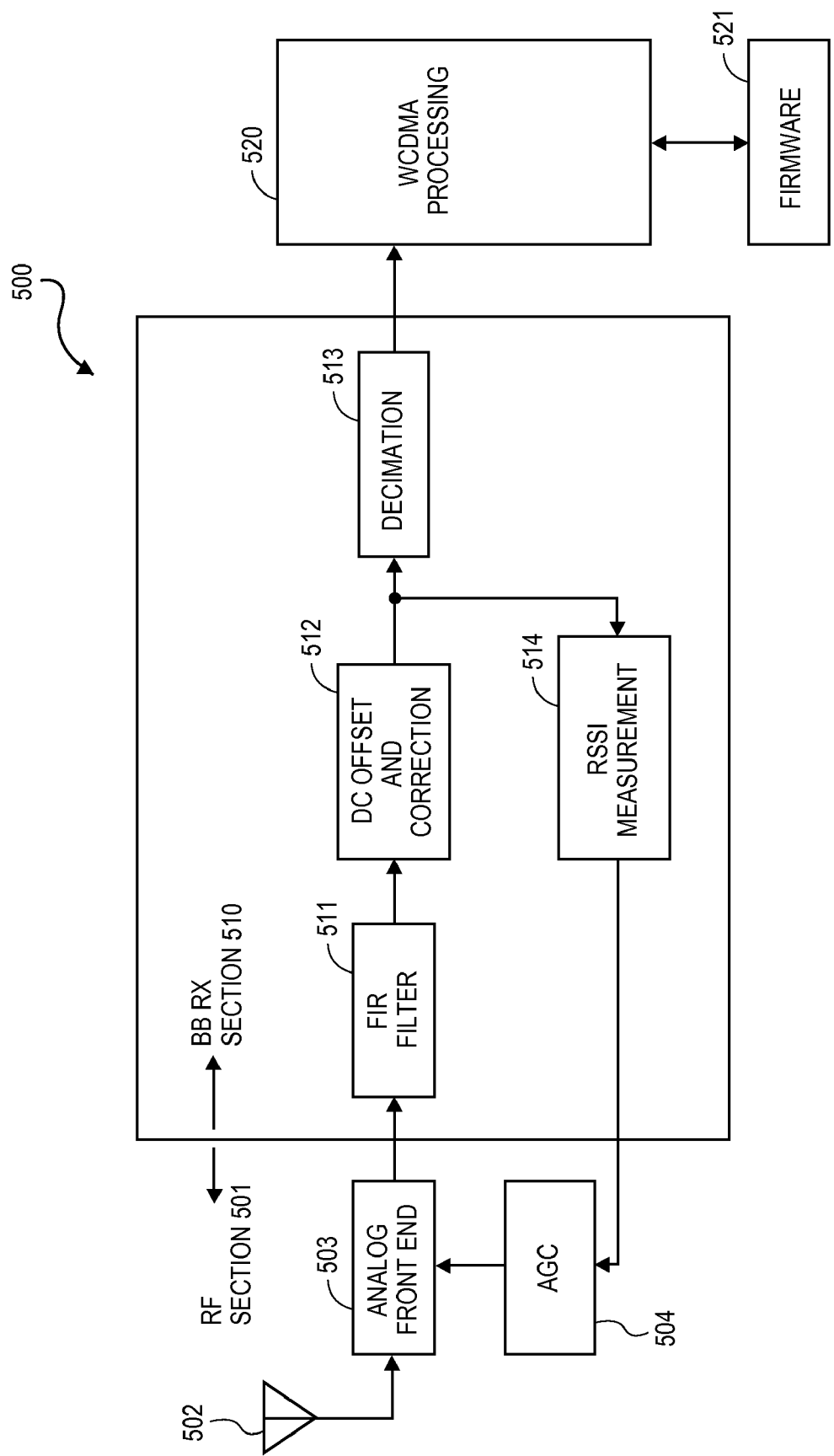
FIG. 7 is a block diagram of a receiver portion of a wireless communication device used to practice an embodiment of the invention.

FIG. 7 shows one example embodiment of a receiver portion of UE 401. A receiver 500 receives signals of the aforementioned CPICH, SCH and DPCH at antenna 502 and couples the radio frequency (RF) signals to analog front end 503. RF section 501 of receiver 500 may employ other front end sections and is not limited to the shown analog front end 503. Converted output from analog front end 503 is then coupled to a receiver section of a baseband processing module (BB RX) 510 for baseband processing. BB RX 510 includes a finite-impulse-response (FIR) filter 511, DC offset and correction module 512 and decimation module 513 to perform baseband processing of the received signal. A RSSI measurement module 514 may also be included to provide received signal strength indication to automatic gain control (AGC) module 504, which is part of RF section 501. Radio 204 of FIG. 2 may be readily implemented for RF and BB RX sections 501, 510. Baseband processing module 222 of FIG. 3 may also be incorporated as part of receiver 500. It is to be noted that a variety of designs may be implemented for receiver 500.

Output from BB RX 510 is coupled to WCDMA processing module 520 for further WCDMA signal processing with conjunction with processing firmware 521. In one embodiment, WCDMA processing module 520 and firmware 521 reside within a host, such as host device of FIG. 2. In other implementations, WCDMA processing module 520 and/or firmware 521 may reside within baseband processing module 222. Module 520 may reside elsewhere as well. In the particular example shown in FIG. 6, WCDMA processing module 520 and firmware 521 reside in baseband processing module 222. It is also to be noted that wireless communications may also employ various finger processing and in one embodiment, WCDMA processing module 520 includes such finger processing. Finger processing for wireless communications are generally known in the art.

In order to obtain SCH noise power estimation, the embodiments of the invention measure CPICH power during the period when SCH is present and during the period when SCH is not present. The difference of the two provides an estimate of SCH power. In one particular embodiment described below, estimation of SCH power is derived from estimating noise power separately from CPICH samples that overlap with SCH symbol and those that do not overlap with SCH. This estimation may be made for no transmit diversity (1 transmit antenna) condition and also for transmit diversity (e.g. 2 transmit antenna) condition. Since SCH and CPICH slots are synchronized and the chip value for SCH is fixed and known, the location of CPICH samples that overlap (or do not overlap) with SCH symbol is known.

Figure 8:
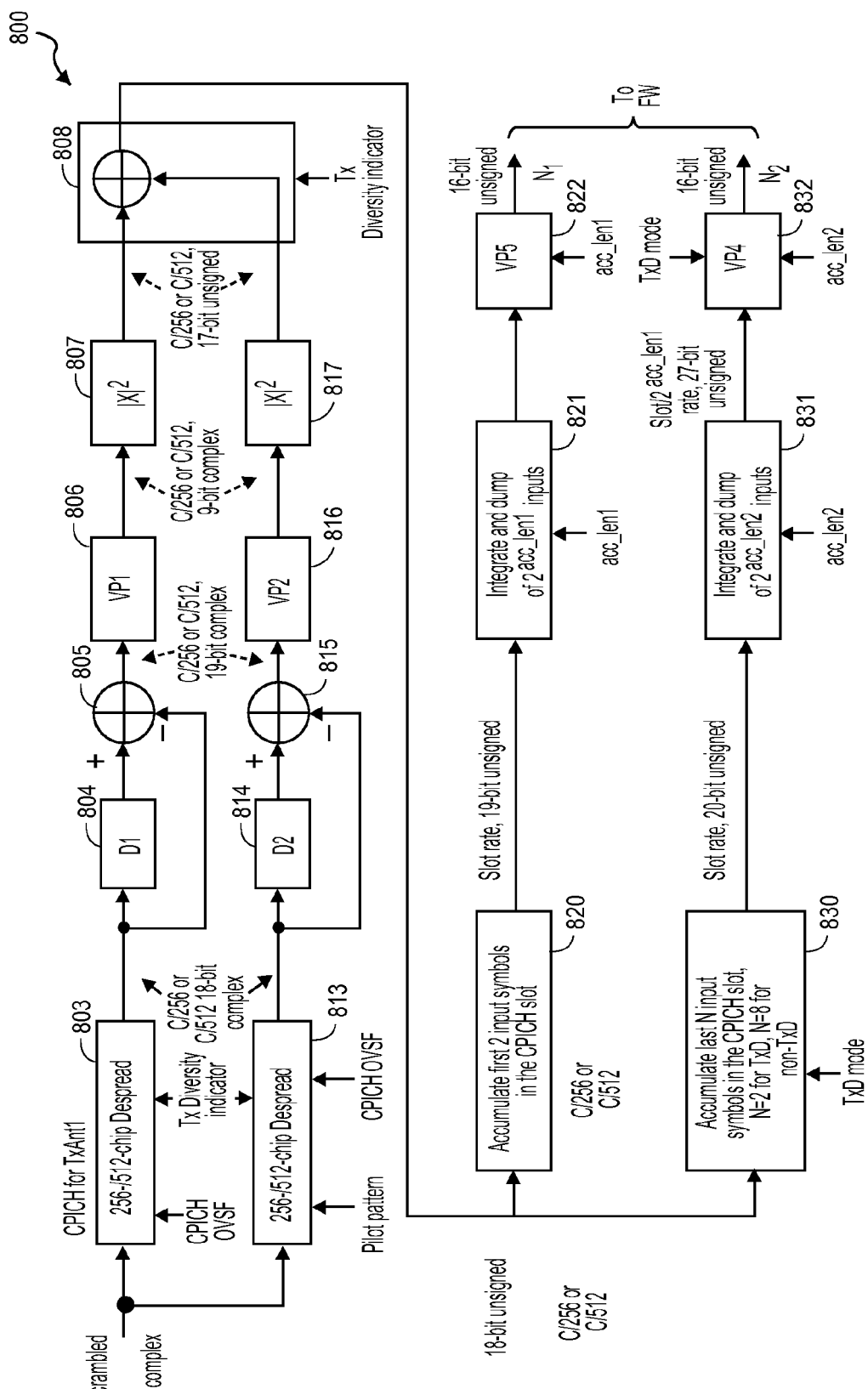
FIG. 8 is a block diagram showing one embodiment of the invention for obtaining a noise estimate for CPICH and calculating a noise estimate for SCH.

FIG. 8 shows one specific embodiment for implementing a CPICH processing module 800 that determines CPICH noise power for samples that overlap with SCH and for samples that do not overlap with SCH. Module 800 receives descrambled complex chip-rate (Cx1) samples. Descrambling of CPICH, as well as other signals, may be performed by a descrambler, which may be located in WCDMA processing module 520. The descrambler may be located in BB RX 510 in other embodiments. The descrambled CPICH and SCH are input to module 800.

As shown in FIG. 8, the descrambled complex chip-rate (Cx1) samples are despread to generate 256-chip or 512-chip symbols in despread modules 803 and 813. The leg with despread module 813 to process signals from a second antenna (antenna 2) is only used when transmit antenna diversity is used. 256-chip is used without antenna diversity, while 512-chip is used when antenna diversity is present. The despread is aligned with the CPICH frame boundary. An Orthogonal Variable Spreading Factor (OVSF) is used with the despreading as well. In this particular embodiment where DPCH is described, CPICH phase reference is the phase reference used for DPCH. Next, noise samples are obtained by taking the difference of the input 256-chip (or 512-chip) despread symbols in modules 804, 805 and 814, 815. Noise samples are then quantized by View Port (VP) modules 806 and 816 to bring down the bit width and squared in modules 807, 817. When transmit diversity exists, the output from module 817 is combined with the output from module 807 in summation module 808 before being sent to sample separation. The upper portion of FIG. 8 generates a combined noise estimate for CPICH and SCH.

The lower portion of FIG. 8 provides two separate processing routes for determining the noise power level of CPICH. The first leg includes symbol processing module 820, which accumulates the first two input symbols of each N-symbol CPICH slot. The second leg includes symbol processing module 830, which accumulates the last N input symbols of each N-symbol CPICH slot. In one embodiment N=2 with transmit diversity and N=8 with no transmit diversity. It is to be noted that the number of samples taken may vary in other embodiments.

The output of module 820 is coupled to integrate and dump module 821, which receives an accumulation length value acc_len1. The acc_len1 value sets the additional accumulation length of the noise power containing SCH. The acc_len1 value sets $2^{acc\_len1}$ slots to be accumulated. Output of module 821 is coupled to VP 822, which selects sixteen bits for output $N_1$. Output $N_1$ is the average noise power that contains SCH.

Similarly, output of module 830 is coupled to integrate and dump module 831, which receives an accumulation length acc_len2. The acc_len2 value sets the additional accumulation length of the noise power not containing SCH. The acc_len2 signal value sets $2^{acc\_len2}$ slots to be accumulated. Output of module 831 is coupled to VP 832, which selects sixteen bits for output $N_2$. Output $N_2$ is the average noise power that does not contain SCH. The two power values $N_1$ and $N_2$ are coupled to firmware where a calculation is performed to subtract $N_1$ from $N_2$ to obtain an estimated power value for SCH.

Furthermore, when multiple finger processing is being implemented in the receiver of the UE, CPICH processing module 800 may be implemented in one finger processing module or in multiple finger processing modules. It may be implemented in each of the finger processing modules. The multiple average noise values derived may then be combined and processed according to the finger management technique employed in the receiver.

Figures 9A, 9B:
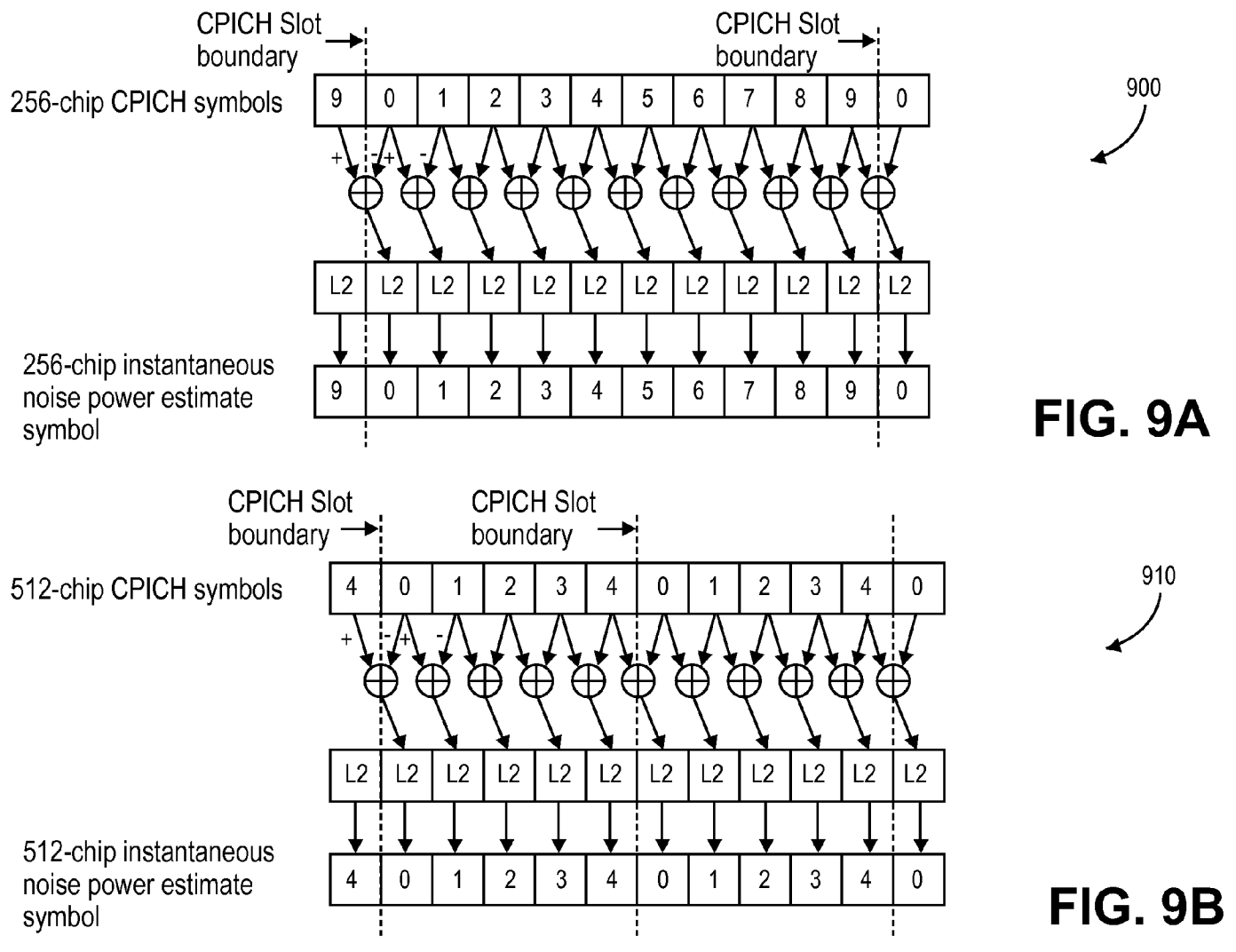

In determining average power for the CPICH slots, a number of techniques may be used. FIG. 9A shows one technique used when there is no transmit diversity and FIG. 9B shows another technique when there is transmit diversity. In FIG. 9A, a 2560-chip CPICH slot 900 is shown divided into ten 256-chip CPICH symbols (symbols #0-#9). The first two symbols of each CPICH slot (symbols #0 and #1) are used to average the noise level of CPICH and SCH. The remaining eight symbols (symbols #2-#9) are used to average CPICH only. Taking the difference of the input 256-chip despread symbols in modules 804 and 805 generates a 10 symbol noise estimate. Modules 807 and 817 then calculate the noise sample power and power estimate at the output of summation module 808 is obtained. The first two symbol periods that average CPICH and SCH are processed by module 820 to eventually generate output $N_1$. The remaining symbols that average CPICH are processed by module 830 to eventually generate output $N_2$. Note that in the described embodiment, first two symbol periods of CPICH are used for averaging CPICH and SCH.

In estimating noise power, if the noise power (over the 256-chip SCH interval) is represented as a $\sigma_0^2$ due to the SCH symbol and $\sigma^2$ due to the rest of the interference noise, average power estimate for each symbol for a slot may be represented in Table A.

TABLE A

| 256-chip symbol index in a slot | Average noise power |
|---|---|
| 0 | $\sigma_0^2 + 2\sigma^2$ |
| 1 | $\sigma_0^2 + 2\sigma^2$ |
| 2 | $2\sigma^2$ |
| 3 | $2\sigma^2$ |
| 4 | $2\sigma^2$ |
| 5 | $2\sigma^2$ |
| 6 | $2\sigma^2$ |
| 7 | $2\sigma^2$ |
| 8 | $2\sigma^2$ |
| 9 | $2\sigma^2$ |

Averaging the last eight symbols of the SPICH slot generates the value $2\sigma^2$, while averaging CPICH and SCH during the first two symbol periods of the CPICH slot generates the value $\sigma_0^2+2\sigma^2$. The firmware then can derive SCH power by performing the subtraction.

FIG. 9B shows a 2560-chip CPICH slot 910 that is divided into five 512-chip CPICH symbols (symbols #0-#4). The format of slot 910 is used when antenna diversity is present with the use of two transmitting antennas. The first two symbols of each CPICH slot (symbols #0 and #1) are used to average the noise level of CPICH and SCH. The remaining three symbols (#2-#4) are used to average CPICH only. Taking the differences of the input 512-chip despread symbols in modules 804, 805, 814, 815 generates a five symbol noise estimate. Modules 807 and 817 calculate the noise sample power and power estimate at the output of summation module 808 is obtained. The first two symbol periods that average CPICH and SCH are processed by module 820 to eventually generate output $N_1$. The remaining symbols that average CPICH are processed by module 830 to eventually generate output $N_2$. It is to be noted that although the remaining three symbol periods may be averaged, in the described embodiment only the last two symbols of the slot are averaged. This simplifies the division by a factor of two, without degrading the noise estimation.

In estimating noise power, if the noise power (over the 256-chip SCH interval) is represented as $\sigma_0^2$ due to the SCH symbol and $\sigma^2$ due to the rest of the interference noise, average power estimate for each 512-chip symbol for a slot may be represented in Table B.

TABLE B

| 512-chip symbol index in a slot | Average noise power |
|---|---|
| 0 | $\sigma_0^2 + 4\sigma^2$ |
| 1 | $\sigma_0^2 + 4\sigma^2$ |
| 2 | $4\sigma^2$ |
| 3 | $4\sigma^2$ |
| 4 | $4\sigma^2$ |

Averaging the last two symbols of the CPICH slot generates the value $4\sigma^2$, while averaging the first two symbol periods of the CPICH slot gives the value $\sigma_0^2+4\sigma^2$. The firmware then can derive the SCH power by performing the subtraction. Note that only the last two symbols are averaged (instead of three symbols) in order to simplify the averaging, which may be done by the division of powers of two. However, other embodiments may average over the last three symbols.

A number of advantages may be derived by knowing the noise power of SCH separate from the overall CPICH noise. FIG. 10 illustrates one such example. FIG. 10 shows DPCH frame 410 as well as a number of SCH locations 405A-D (locations 1-4). Recall that in most instances, there is an offset between the start of the CPICH frame and the start of the DPCH frame. Since SCH is synchronized with CPICH, there is an offset between the commencement of SCH and each of the DPCH slots. Depending on the amount of the offset, SCH may fall within any of the segments of DPCH. If the offset is such that SCH falls within the time period of the $N_{pilot}$ bits (noted by location 1), the SCH symbol would add to the noise power value of the Pilot of DPCH and give a false indication of Data-to-Pilot SNR. Accordingly, processing (such as within the firmware) may then account for the SCH and compensate for the SCH power value to obtain a more accurate indication of the power in the Pilot for SNR calculations.

Likewise, if SCH falls within the time period of Data2 (noted by location 2), the SCH symbol would add to the noise power value of the Data2 component and give a false indication of the signal power in the Data2 component. In this case the SNR that is estimated from the pilot may be overly optimistic as the pilot segment does not see the interference from the SCH. Accordingly, processing may then account for the SCH and compensate for the SCH power value to obtain a more accurate indication of the power in Data2. A similar scenario would be applicable if SCH fell within the data bits of Data1.

When the SCH symbol falls within the TPC or TFCI (noted by location 3), typically no adjustments are needed, since these bits are control bits and not used for SNR calculations. However, power compensations may be implemented, if desired. Furthermore, in the instance SCH overlaps two different segments of DPCH (noted by location 4), adjustments may be made to the power calculation based on the fractional portion of SCH that is present in the pilot and/or the data segment(s). The fractional portion of SCH residing with a certain segment is easily determined, since the offset between CPICH and DPCH is known to the UE.

Thus, a technique for synchronization channel noise estimation is described. The example described above referenced DPCH, however, other signals may be analyzed as well. Once SCH power value estimation is obtained, the value may be employed in various other calculations and applications.

As may be used herein, the terms "substantially" and "approximately" provides an industry-accepted tolerance for its corresponding term and/or relativity between items. Such an industry-accepted tolerance ranges from less than one percent to fifty percent and corresponds to, but is not limited to, component values, integrated circuit process variations, temperature variations, rise and fall times, and/or thermal noise. Such relativity between items ranges from a difference of a few percent to magnitude differences. As may also be used herein, the term(s) "coupled" and/or "coupling" includes direct coupling between items and/or indirect coupling between items via an intervening item (e.g., an item includes, but is not limited to, a component, an element, a circuit, and/or a module) where, for indirect coupling, the intervening item does not modify the information of a signal but may adjust its current level, voltage level, and/or power level. As may further be used herein, inferred coupling (i.e., where one element is coupled to another element by inference) includes direct and indirect coupling between two items in the same manner as "coupled to". As may even further be used herein, the term "operable to" indicates that an item includes one or more of power connections, input(s), output(s), etc., to perform one or more its corresponding functions and may further include inferred coupling to one or more other items.

Furthermore, the term "module" is used herein to describe a functional block and may represent hardware, software, firmware, etc., without limitation to its structure. A "module" may be a circuit, integrated circuit chip or chips, assembly or other component configurations. Accordingly, a "processing module" may be a single processing device or a plurality of processing devices. Such a processing device may be a microprocessor, micro-controller, digital signal processor, microcomputer, central processing unit, field programmable gate array, programmable logic device, state machine, logic circuitry, analog circuitry, digital circuitry, and/or any device that manipulates signals (analog and/or digital) based on hard coding of the circuitry and/or operational instructions and such processing device may have accompanying memory. A "module" may also be software or software operating in conjunction with hardware.

The embodiments of the present invention have been described above with the aid of functional building blocks illustrating the performance of certain functions. The boundaries of these functional building blocks have been arbitrarily defined for convenience of description. Alternate boundaries could be defined as long as the certain functions are appropriately performed. Similarly, flow diagram blocks and methods of practicing the embodiments of the invention may also have been arbitrarily defined herein to illustrate certain significant functionality. To the extent used, the flow diagram block boundaries and methods could have been defined otherwise and still perform the certain significant functionality. Such alternate definitions of functional building blocks, flow diagram blocks and methods are thus within the scope and spirit of the claimed embodiments of the invention. One of ordinary skill in the art may also recognize that the functional building blocks, and other illustrative blocks, modules and components herein, may be implemented as illustrated or by discrete components, application specific integrated circuits, processors executing appropriate software and the like or any combination thereof.

We claim:

1. An apparatus comprising:
a first symbol processing module coupled to receive a first pre-defined number of symbols of a slot of a downlink common pilot channel that has multiple slots, in which the first symbol processing module accumulates over the first pre-defined number of symbols to obtain a first average noise estimation over the first pre-defined number of symbols for the slot, wherein the first average noise estimation includes noise effects of a synchronization channel that is present during a time period synchronized to the first pre-defined number of symbols; and
a second symbol processing module coupled to receive subsequent N number of symbols of the slot following the first pre-defined number of symbols of the slot, in which the second symbol processing module accumulates over the N number of symbols of the slot of the downlink common pilot channel to obtain a second average noise estimation, wherein the second average noise estimation does not include the noise effects of the synchronization channel; and
a third processing module to subtract the second average noise estimation from the first average noise estimation to derive a noise estimation for the synchronization channel.

2. The apparatus of claim 1, wherein first two symbols of the slot are used as the first pre-defined number of symbols.

3. The apparatus of claim 1, wherein the downlink common pilot channel is a Common Pilot Channel (CPICH), and the synchronization channel is a Synchronization Channel (SCH) defined in a $3^{rd}$ Generation Partnership Project standard specification.

4. The apparatus of claim 1, wherein the synchronization channel is present for approximately 1/10 of a duration of the slot of the downlink common pilot channel.

5. The apparatus of claim 3, wherein the first pre-defined number of symbols is first two symbols of each slot of CPICH and the N number of symbols are remaining symbols of each slot of CPICH.

6. A method comprising:
processing a first pre-defined number of symbols of a slot of a downlink common pilot channel that has multiple slots, in order to accumulate over the first pre-defined number of symbols to obtain a first average noise estimation over the first pre-defined number of symbols for the slot, wherein the first average noise estimation includes noise effects of a synchronization channel that is present during a time period synchronized to the first pre-defined number of symbols;
processing subsequent N number of symbols of the slot following the first pre-defined number of symbols of the slot, in order to accumulate over the N number of symbols of the slot of the downlink common pilot channel to obtain a second average noise estimation, wherein the second average noise estimation does not include the noise effects of the synchronization channel; and
processing to subtract the second average noise estimation from the first average noise estimation to derive a noise estimation for the synchronization channel.

7. The method of claim 6, wherein when processing, first two symbols of the slot are used as the first pre-defined number of symbols.

8. The method of claim 7, wherein when processing, N number of symbols are remaining symbols of the slot.

9. The method of claim 8 further comprising applying the derived noise estimation for the synchronization channel to a signal component that is transmitted during a period that the downlink common pilot channel and synchronization channel are transmitted to compensate for additional noise introduced by the synchronization channel when the synchronization channel is present.

10. The method claim 9, wherein the downlink common pilot channel is a Common Pilot Channel (CPICH), and the synchronization channel is a Synchronization Channel (SCH) defined in a $3^{rd}$ Generation Partnership Project standard specification.

11. The method of claim 10 further comprising adjusting for a timing offset between SCH and a signal component of a Dedicated Physical Channel (DPCH) defined in a $3^{rd}$ Generation Partnership Project standard specification and compensating for noise power in SCH overlapping the DPCH signal component to calculate a signal-to-noise ratio (SNR).

* * * * *